United States Patent [19]

Ott

[11] Patent Number: 4,993,245

[45] Date of Patent: Feb. 19, 1991

[54] SECURITY TAG FOR USE ON ARTICLES OF CLOTHING AND THE LIKE

[75] Inventor: Heinz Ott, Homburg-Bruchhof, Fed. Rep. of Germany

[73] Assignees: Frank Ott, Homburg-Bruchnof, Fed. Rep. of Germany; Etsuji Yokoyama, Hiroshima, Japan

[21] Appl. No.: 341,127

[22] Filed: Apr. 20, 1989

[30] Foreign Application Priority Data

Mar. 28, 1989 [DE] Fed. Rep. of Germany ....... 3910064

[51] Int. Cl.[5] ........................ F16B 21/00; G08B 13/14

[52] U.S. Cl. .................................... 70/57.1; 24/704.1; 24/706.8; 340/572

[58] Field of Search ............ 70/57.1; 24/704.1, 706.8; 340/572

[56] References Cited

U.S. PATENT DOCUMENTS

| | | | |
|---|---|---|---|
| 2,006,051 | 6/1935 | Keidel . | |
| 3,147,607 | 9/1964 | Calvano et al. . | |
| 3,858,280 | 1/1975 | Martens | 24/706.8 X |
| 4,221,025 | 9/1980 | Martens et al. | 24/706.8 X |
| 4,280,256 | 7/1981 | de Jong | 24/706.8 |
| 4,670,950 | 6/1987 | Wisecup et al. | 70/57.1 |
| 4,685,234 | 8/1987 | Anderson et al. | 340/572 X |
| 4,745,664 | 5/1988 | Damvig et al. | 24/704.1 |
| 4,847,592 | 7/1989 | Esch et al. | 340/572 |

FOREIGN PATENT DOCUMENTS

| | | | |
|---|---|---|---|
| 0021849 | 1/1981 | European Pat. Off. | 70/57.1 |
| 2460643 | 7/1975 | Fed. Rep. of Germany . | |
| 3820820 | 1/1989 | Fed. Rep. of Germany . | |

*Primary Examiner*—Lloyd A. Gall
*Attorney, Agent, or Firm*—Peter K. Kontler

[57] ABSTRACT

A reusable security tag for use on merchandise in department stores and like establishments has a housing which confines a locking device, a leaf spring and a signal generator. The locking device can receive the shank of a retaining member having a head which holds a portion of an article of clothing or other merchandise between itself and the housing. The locking device can release the shank by way of the spring in response to deformation of a selected component of the housing, or in response to placing of a magnet adjacent the housing so that the magnet can shift a ferromagnetic member which is reciprocably installed in the housing and can change the position of a reciprocable shaft forming part of the locking device.

14 Claims, 3 Drawing Sheets

SECURITY TAG FOR USE ON ARTICLES OF CLOTHING AND THE LIKE

BACKGROUND OF THE INVENTION

The invention relates to security tags in general, and more particularly to improvements in reusable security tags.

Security tags are used in department stores, clothing stores and many other establishments to prevent unauthorized removal of merchandise from the premises. A security tag normally comprises a housing for a signal generator and means for releasably attaching the housing to the merchandise which is to be secured against theft. The signal generator actuates an alarm at the exit from the premises if an unauthorized person, such as a thief, attempts to remove tagged merchandise with the housing thereon.

German Pat. No. 24 60 643 to Humble et al. discloses a reusable security tag wherein the housing confines an elastic locking device in the form of a piece of metallic sheet material. The locking device has jaws or claws which enter the notches of a pin-shaped retaining member serVing to secure the merchandise to the housing. The jaws can be disengaged from the retaining member only by mechanical means, such as by pliers. This is often a time-consuming operation which is undesirable when a security tag must be removed from a legitimately purchased article of clothing or the like while the establishment is crowded with customers.

Published German patent application No. 38 20 820 of Bussard discloses a modified reusable security tag. The locking device includes a magnetizable member which can be assembled of two leaf springs. A drawback of the security tag of Bussard is that it can be separated from merchandise only in a single way, namely by resorting to a magnet.

U.S. Pat. No. 3,147,607 to Calvano et al. discloses a safety padlock for use with mail bags. The two sections of the housing of the padlock are articulately connected to each other by a hinge and can be secured to each other by a rudimentary locking device. The purpose of this padlock is to furnish evidence of unauthorized tampering with the locking device rather than to generate an alarm if the commodity to which the housing is attached is removed from designated premises.

A seal wherein the locking device in a housing includes an elastic piece of metallic sheet material with jaws or claws capable of entering notches in a U-shaped shackle is disclosed in U.S. Pat. No. 2,006,051 to Keidel. A drawback of the patented locking device is that it cannot be separated from the secured commodity without destroying the shackle.

OBJECTS OF THE INVENTION

An object of the invention is to provide a novel and improved security tag which can be applied to and disengaged from selected commodities in a simple and time-saving manner.

Another object of the invention is to provide a security tag which can be detached from merchandise or other secured commodities in a plurality of different ways.

A further object of the invention is to provide a novel and improved housing for use in the above outlined security tag.

An additional object of the invention is to provide a novel and improved locking device for use in the housing of the above outlined security tag.

Still another object of the invention is to provide a novel and improved method of disengaging a security tag from the secured commodity.

A further object of the invention is to provide a security tag wherein the member which serves to releasably retain the housing on a secured commodity need not be notched and/or otherwise shaped for the purpose of ensuring reliable retention by the locking device.

Another object of the invention is to provide a novel and improved combination of housing and mechanically and magnetically releasable locking device for use in the above outlined security tag.

SUMMARY OF THE INVENTION

The invention is embodied in a reusable security tag which can be applied to garments or other commodities to prevent unauthorized removal of commodities from a shop, a store or a like establishment. The improved security tag comprises a housing including a deformable component and defining an internal chamber, a signal generator which is secured in the housing and is operative to actuate an alarm device if the housing is being removed from premises which are designated for storage of the tag and of the commodity which is attached thereto, a retaining member having a first portion which extends into the chamber and a second portion which is outwardly adjacent the housing and serves to retain a portion of a commodity between such second portion and the housing (thus, the commodity can be separated from the housing and from the signal generator only after the first portion of the retaining member is extracted from the housing), and means for releasably locking the first portion of the retaining member in the housing. The locking means is disengageable from the first portion of the retaining member in response to mechanical deformation of the aforementioned component of the housing or in response to the application of magnetic force to thus permit extraction of the first portion of the retaining member from the housing with attendant separation of the aforementioned portion of the commodity from the housing. When the retaining member is separated from the commodity, it is ready to retain a portion of a further commodity between its second portion and the housing in response to reinsertion of the first portion into the housing and into engagement with the locking means.

In accordance with a presently preferred embodiment, the housing of the improved security tag consists of a non-metallic (e.g., synthetic plastic) material and comprises a first section and a second section. The second section constitutes the aforementioned deformable component of the housing. The first portion of the retaining member can constitute an elongated shank, and the second portion of such retaining member can constitute a head (e.g., not unlike a rivet head) at one end of the shank. The locking means can include a non-magnetic casing having an inlet aperture for the shank, at least one clamping element (e.g., a sphere) which is movable into and from engagement with the shank in the casing, displacing means for moving the sphere or spheres into engagement with the shank, and mechanically and magnetically displaceable ferromagnetic means for disengaging the sphere or spheres from the shank in the casing by way of the displacing means so that the shank can be extracted from the casing and from the housing with attendant liberation of the commodity.

The displacing means can include a reciprocable carrier (e.g., an elongated shaft), a pusher or platform provided on the carrier adjacent the sphere or spheres, and a stressed coil spring or other suitable means for biasing the carrier in a direction to urge the pusher against the sphere or spheres and to thereby maintain the sphere or spheres in engagement with the shank (i.e., the shank cannot be extracted from the casing and from the housing). The carrier can be provided with an axial hole for the shank.

The ferromagnetic means is installed in the housing outwardly adjacent the casing and is connected to the carrier. The security tag preferably further comprises resilient means (e.g., a leaf spring with two mirror symmetrical halves) which is disposed in the housing and serves to move the ferromagnetic means in response to deformation of the second section of the housing to thereby permit or cause disengagement of the sphere or spheres from the shank in the hole of the carrier.

The casing can include a cage for the sphere or spheres, and the carrier can be provided with a substantially radially extending opening for each sphere. Each opening communicates with the hole in the carrier adjacent the cage, and the pusher and/or the casing is then provided with means (e.g., with one or more suitably inclined cam faces) for shifting the sphere or spheres in the opening or openings of the carrier so that each sphere is maintained in engagement with the shank in the hole of the carrier when the coil spring is free to maintain the carrier and the pusher in their operative positions with reference to the casing. Each sphere can be maintained in rolling contact with the pusher.

The sections of the housing are preferably provided with abutments which properly locate the aforementioned resilient means. The latter preferably comprises inclined end portions each of which engages an abutment of at least one section of the housing and makes an acute angle (e.g., an angle of approximately 25 degrees) with the direction of reciprocation of the carrier. Such resilient means preferably further comprises arms which are inwardly adjacent the respective end portions and make with the direction of reciprocation of the carrier an acute angle (e.g., an angle of approximately 65 degrees).

The second section of the housing can be provided with a socket for the resilient means and for the ferromagnetic means, and with notches for portions of the arms of the resilient means. This ensures that the resilient means is properly located in the housing in order to move the ferromagnetic means in a direction to permit disengagement of the sphere or spheres from the shank in the hole of the carrier in response to deformation of the second section of the housing.

A magnet which is used to effect disengagement of the sphere or spheres from the shank in the carrier can be placed adjacent the recess of the second section of the housing to attract or repel the ferromagnetic means. Tongs or any other suitable implement can be used to deform the second section of the housing in order to mechanically shift the carrier and the pusher with reference to the casing in order to permit authorized extraction of the shank from the casing and from the housing.

The novel features which are considered as characteristic of the invention are set forth in particular in the appended claims. The improved security tag itself, however, both as to its construction and the mode of attaching or detaching the same, together with additional features and advantages thereof, will be best understood upon perusal of the following detailed description of certain specific embodiments with reference to the accompanying drawing.

DESCRIPTION OF PREFERRED EMBODIMENTS

Figure 4:
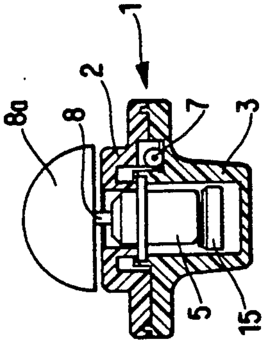
FIG. 4 is a transverse sectional view substantially as seen in the direction of arrows from the line IV—IV of FIG. 1.
Figure 5:
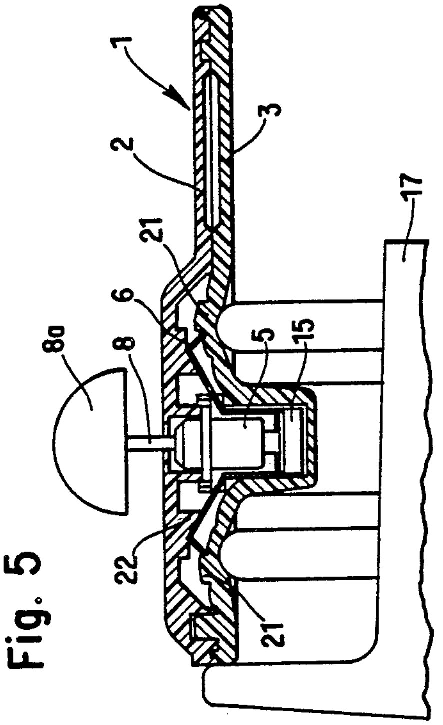
FIG. 5 is a sectional view similar to that of FIG. 1 but showing the retaining member in partly extracted position and further showing a portion of an implement which can be used to mechanically deform a component of the housing in order to permit extraction of the first portion of the retaining member from the casing of the locking means and from the housing.

Referring to FIGS. 1 to 5, there is shown a reusable security tag which comprises a non-metallic (e.g., plastic) housing 1 composed of two flat components or sections 2 and 3. Several portions of these sections are permanently secured to each other by rivets 1*a* or other suitable fasteners. The sections 2 and 3 define an internal chamber 4 for a novel and improved locking device 5 and for a resilient element in the form of a two-armed leaf spring 6. The chamber 4 further accommodates an electronic signal generator 7 of known design. The purpose of the signal generator 7 is to induce an alarm device at the exit or exits of the premises for commodities 29 which are provided with security tags to generate a readily detectable visible, audible and/or other signal if the commodities are about to be removed from the premises by unauthorized persons, i.e., with the housings 1 still attached to the commodities.

Figure 8:
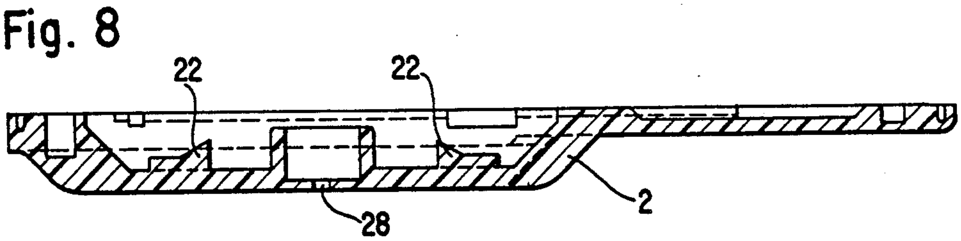
FIG. 8 is an enlarged sectional view of another part of the housing, the section being taken in the direction of arrow as seen from the line VIII—VIII in FIG. 9.
Figure 9:
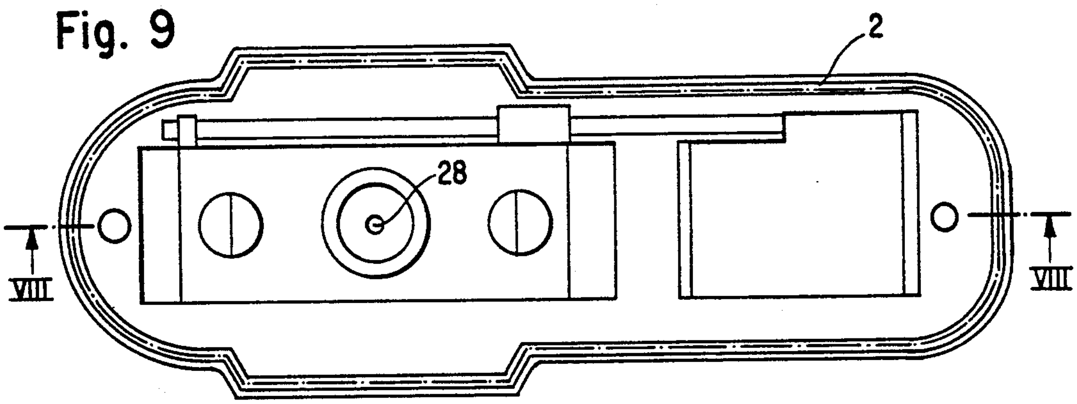
FIG. 9 is a plan view of the part which is shown in FIG. 8.

The security tag of FIGS. 1 to 5 further comprises a retaining member in the form of a bolt or rivet including an elongated shank 8 and an enlarged portion (hereinafter called head) 8*a* at one end of the shank. The diameter of the shank 8 is preferably selected in such a way that it can be readily caused to penetrate through a portion of textile material (e.g., through a portion of a garment 29 in a department store or in a similar establishment) without damaging the commodity. When the retaining member is properly assembled with the locking device 5, the head 8*a* cooperates with the adjacent portion of the housing section 2 to reliably retain a portion of the commodity 29 so that the confined portion can be liberated (and the commodity separated from the housing 1) only in response to extraction of the shank 8 from the locking device 5 and from the housing 1. The section 2 of the housing 1 has an aperture 28 (FIGS. 8 and 9) for insertion of the shank 8 into the locking device 5.

Figure 1:
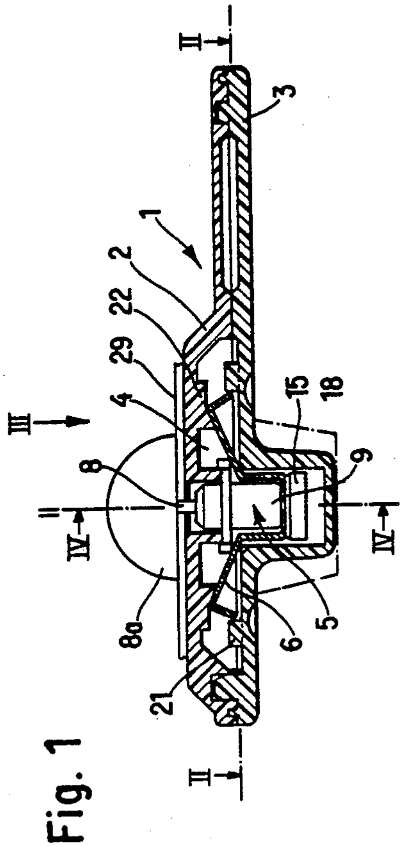
FIG. 1 is a central sectional view of a security tag which embodies one form of the invention and is connected to a portion of an article of clothing which is to be protected against unauthorized removal from the premises of the owner, a magnet which can be used to release the article of clothing by way of ferromagnetic means in the housing being indicated by phantom lines and the section being taken in the direction of arrows as seen from the line I—I of FIG. 2.
Figure 2:
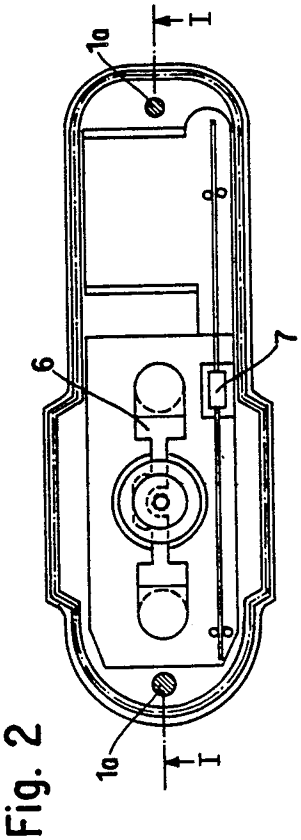
FIG. 2 is a sectional view substantially as seen in the direction of arrows from the line II—II of FIG. 1.
Figure 3:
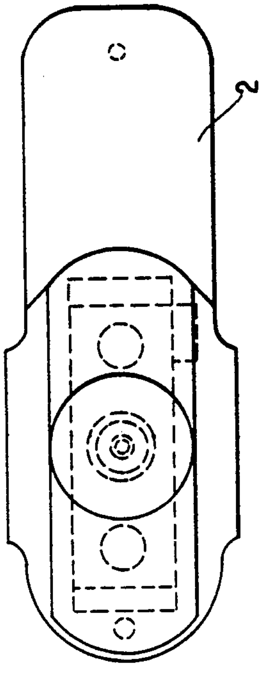
FIG. 3 is a plan view as seen in the direction of arrow III in FIG. 1, with the article of clothing omitted.

In accordance with a feature of the invention, the shank 8 of the retaining member can be extracted from the locking device 5 by mechanical means (such as the tongs 17 of FIG. 5) or by a magnet (a portion of a magnet 18 is indicated in FIG. 1 by phantom lines).

Figure 6:
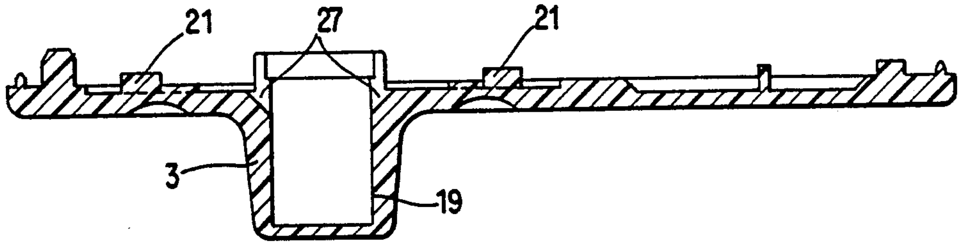
FIG. 6 is an enlarged sectional view of the deformable component of the housing, the section being taken in the direction of arrows as seen from the line VI—VI of FIG. 7.
Figure 12:
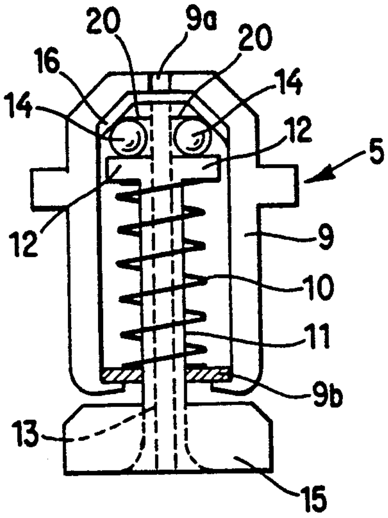
FIG. 12 is a central sectional view of locking means which can be used in the security tag of FIGS. 1 to 5.

One embodiment of the locking device 5 is shown in FIG. 12. This locking device comprises an elongated casing 9 which can be made of brass or bronze or another non-magnetic material. One end of the casing 9 is provided with an aperture 9*a* for introduction of the shank 8 into an axial hole or passage 13 which is provided in an elongated carrier 11 extending from the other end of the casing and being anchored in or made integral with a ferromagnetic member 15. The latter is located in the chamber 4 of the housing 1 in a recess or socket 19 (see FIG. 6) of the section 3. That portion of the carrier 11 which extends into the casing 9 has an annular pusher or piston 12 adjacent a set of spherical clamping elements 14 (hereinafter called balls). That portion of the casing 9 which is adjacent the aperture 9*a* defines a rudimentary cage for the balls 14, and the carrier 11 has radially extending openings 20, one for each ball 14, which communicate with the adjacent portion of the hole 13. A coil spring 10 reacts against a retainer 9*b* in the casing 9 and bears against the pusher 12 to urge the balls 14 against a cam-like casing portion 16 which surrounds the aperture 9*a* and serves to urge the balls 14 radially inwardly into clamping engagement with the shank 8 in the hole 13 of the carrier 11. The median portion 6*a* of the leaf spring 6 is inserted between the casing 9 and the ferromagnetic member 15.

The bias of the coil spring 10 suffices to ensure that the pusher 12 can reliably retain the balls 14 in requisite clamping engagement with the adjacent portion of the shank 8 in the hole 13 of the carrier 11. If the balls 14 are to be disengaged from the shank 8 by magnetic means, the magnet 18 is placed adjacent the outer side of a selected portion of the housing section 3 so that it can attract the ferromagnetic member 15 deeper into the recess or socket 19 of the section 3. The pusher 12 is then retracted from the casing portion 16 and the balls 14 are free to roll in their respective openings 20 away from the shank 8. The shank 8 is then readily extractible from the hole 13 of the carrier 11, through the aperture 9*a* of the casing 9 and through the aperture 28 of the housing section 2. The commodity 29 is then ready to be removed from the premises, with or without the retaining member, as long as the housing 1 and the signal generator 7 are not removed with the commodity.

Figure 13:
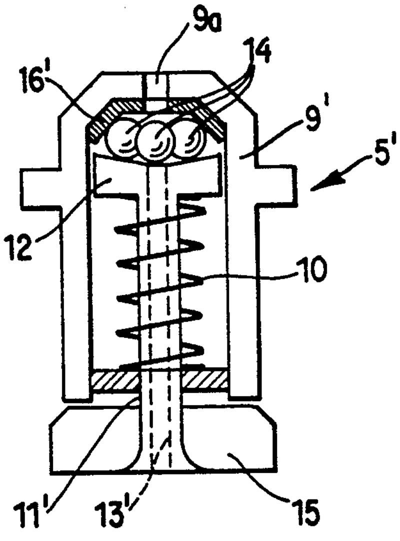
FIG. 13 is a similar sectional view of modified locking means.

A somewhat modified locking device 5' is shown in FIG. 13. This locking device has a casing 9' which is made of a plastic material. An insert 16' is made of steel and forms part of a cage for the balls 14 which are not confined in openings of the carrier 11' for the pusher 12 but are free to roll along the respective side of the pusher except when the coil spring 10 is free to bias the balls against the insert 16' which, in turn, acts as a cam and urges the balls into clamping engagement with the adjacent portion of the shank 8 in the axial passage or hole 13 of the carrier 11'. That end portion of the carrier 11' which extends from the casing 9' is anchored in the ferromagnetic member 15. The insert 16' of FIG. 13 serves the additional purpose of preventing penetration of balls 14 into the material of the casing 9' when the coil spring 10 is free to maintain the balls in clamping engagement with a shank 8 in the hole 13 of the carrier 11'.

Figure 7:
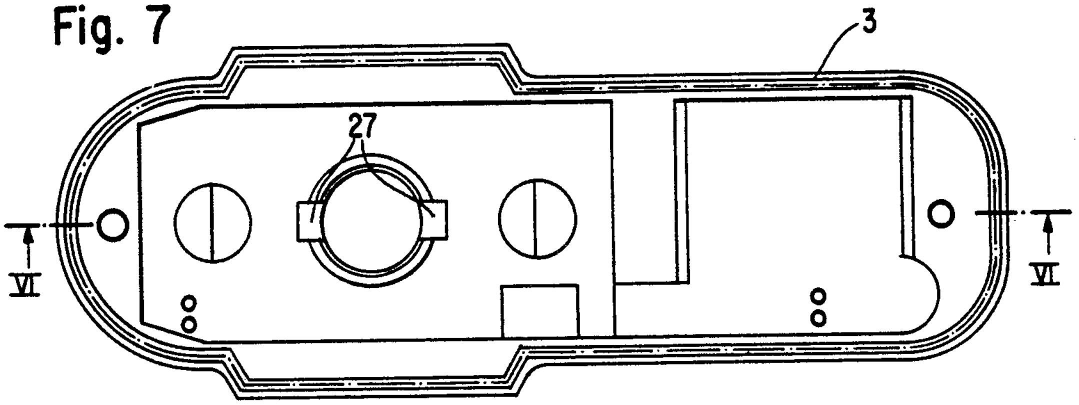
FIG. 7 is a plan view of the component which is shown in FIG. 6.
Figure 10:
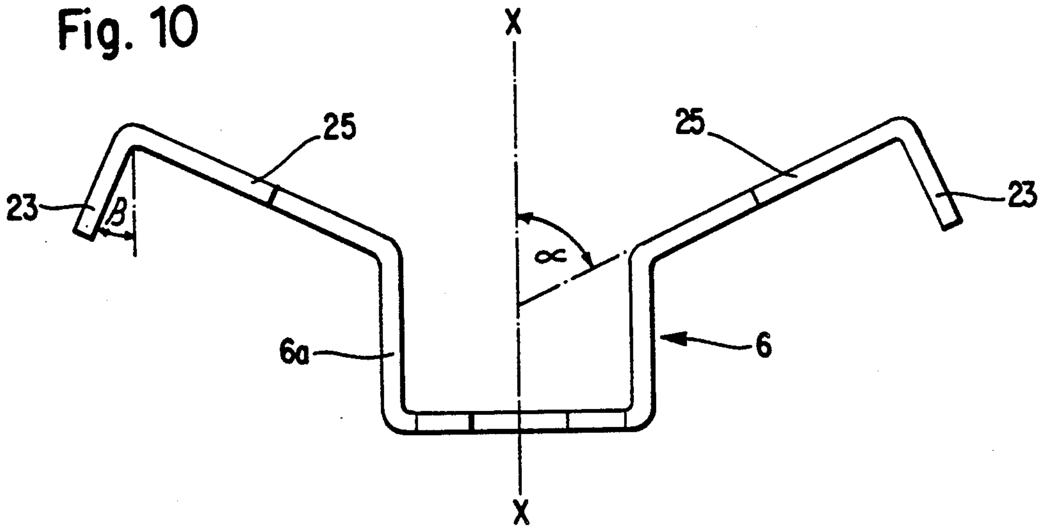
FIG. 10 is an enlarged elevational view of the resilient means in the security tag of FIGS. 1 to 5.
Figure 11:
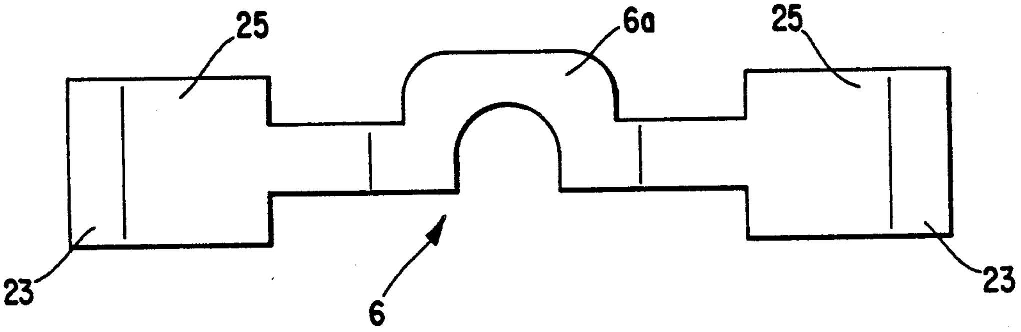
FIG. 11 is a plan view of the resilient means which is shown in FIG. 10.

A presently preferred form of the spring 6 is shown in FIGS. 10 and 11. This spring has two mirror symmetrical halves each of which includes an end portion 23 and an arm 25 which is inwardly adjacent the respective end portion. When the median portion 6*a* of the spring 6 is properly inserted into the socket 19 of the section 3 so that it partially surrounds the carrier 11 or 11' between the ferromagnetic member 15 and the casing 9 or 9*a'*, portions of the arms 25 extend into notches 27 (FIGS. 6 and 7) of the section 3 and the axis X—X of the carrier 11 then makes with the arms 25 an acute angle alpha of approximately 65 degrees. At the same time, the free end portions 23 of the spring 6 and the axis X—X make a smaller acute angle beta of approximately 25 degrees.

The section 2 of the housing 1 has two internal abutments 22 (see particularly FIG. 8) with concave surfaces which engage the junctions of the arms 25 with the respective end portions 23. Internal abutments 21 (FIG. 6) of the section 3 are engaged by the tips of the end portions 23 (see FIGS. 1 and 5) to ensure proper retention of the spring 6 in the chamber 4. Such proper retention is further ensured by the carrier 11 or 11' between the casing 9 or 9' and the ferromagnetic member 15 as well as by the notches 27 of the section 3. The aforementioned angles alpha and beta have been found to be particularly satisfactory to ensure that the median portion 6*a* of the properly inserted spring 6 can push the ferromagnetic member 15 away from the casing 9 or 9' (and to thus permit extraction of the shank 8 from the locking device 5 or 5') if selected portions of the section 3 are deformed by the tongs 17 or an analogous implement which causes the internal abutments 21 of the section 3 to move toward the adjacent portions of the section 2 while the implement 17 holds the marginal portion of the section 2. A comparison of FIGS. 1 and 5 will show that the ferromagnetic member 15 is located in the deepmost portion of the socket 19 when the implement 17 is properly applied to deform the section 3 to an extent which is necessary to permit extraction of the shank 8 from the locking device 5.

The magnet 18 of FIG. 1 has an annular portion which receives the adjacent outwardly extending portion of the section 3, namely that portion of the section 3 which defines the socket 19. This facilitates proper positioning of the housing 1 with reference to the magnet 18 when the latter is to retract the ferromagnetic member 15 in a direction away from the casing 9 of the locking device 5 so that the shank 8 can be inserted into or extracted from the hole 13 of the carrier 11. The coil spring 10 ensures that the locking device 5 or 5' automatically maintains the balls 14 in requisite clamping engagement with the adjacent portion of a properly inserted shank 8 as soon as the magnet 18 is moved away from the housing 1 or as soon as the implement 17 is disengaged from the housing. The material of the section 3 is sufficiently elastic to ensure that the section 3 can reassume its undeformed state when the implement 17 is detached from the housing 1.

An important advantage of the improved security tag is that it can be reused as often as desired, that it can be disengaged from the secured merchandise in a simple and time-saving manner, that. It can be disengaged from the merchandise in more than one manner, and that it can reliably retain the shank 8 in the locking device 5 or 5' even though the shank need not be formed with notches or other features which contribute to the cost of the tag. Still further, one and the same part (the ferromagnetic member 15) can be put to use for mechanical and magnetic disengagement of the balls 14 from the shank 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

We claim:

1. A reusable security tag for application to garments and other commodities, comprising a housing consisting of a non-metallic material and defining a chamber; a signal generator secured to said housing; a retaining member having a first portion including an elongated shank and extending into said chamber, and a second portion outwardly adjacent said housing and arranged to retain a portion of a commodity between itself and the housing, said second portion including a head at one end of said shank; means for releasably locking the first portion of said retaining member in said housing, said locking means being disengageable from said first portion of said retaining member in response to mechanical deformation of a selected component of said housing and in response to the application of magnetic force to thus permit extraction of the first portion of said retaining member from said housing with attendant separation of said portion of a commodity from the housing, said housing comprising a first section and a second section and said second section constituting said component, said locking means including a non-magnetic casing having an inlet for said shank, at least one clamping element movable into and from engagement with the shank, displacing means for moving said at least one clamping element into engagement with said shank, and magnetically and mechanically displaceable ferromagnetic means for disengaging said at least one clamping element from said shank by way of said displacing means, said displacing means including a reciprocable carrier, a pusher provided on said carrier adjacent said at least one clamping element and means for biasing said carrier in a direction to urge said pusher against said at least one clamping element and to thereby maintain said at least one clamping element in engagement with said shank, said ferromagnetic means being disposed in said housing outwardly adjacent said casing and being connected with said carrier; and resilient means disposed in said housing and arranged to move said ferromagnetic means in response to deformation of said second section to thereby permit disengagement of said at least one clamping element from said shank.

2. A reusable security tag for application to garments and other commodities, comprising a housing consisting of a non-metallic material and defining a chamber; a signal generator secured to said housing; a retaining member having a first portion including an elongated shank and extending into said chamber and a second portion outwardly adjacent said housing and arranged to retain a portion of a commodity between itself and the housing, said second portion including a head at one end of said shank; means for releasably locking the first portion of said retaining member in said housing, said locking means being disengageable from said first portion of said retaining member in response to mechanical deformation of a selected component of said housing and in response to the application of magnetic force to thus permit extraction of the first portion of said retaining member from said housing with attendant separation of said portion of a commodity from the housing, said housing comprising a first section and a second section and said second section constituting said component, said locking means including a non-magnetic casing having an inlet for said shank, at least one clamping element movable into and from engagement with the shank, displacing means for moving said at least one clamping element into engagement with said shank, and magnetically and mechanically displaceable ferromagnetic means for disengaging said at least one clamping element from said shank by way of said displacing means, said displacing means including a reciprocable carrier, a pusher provided on said carrier adjacent said at least one clamping element and means for biasing said carrier in a direction to urge said pusher against said at least one clamping element and to thereby maintain said at least one clamping element in engagement with said shank; and resilient means disposed in said housing outwardly adjacent said casing and being deformable in response to deformation of said second section to thereby move said carrier and said pusher to a position in which said at least one clamping element is disengageable from said shank and the latter can be extracted from said casing and said housing.

3. The security tag of claim 1, wherein said at least one clamping element includes a sphere.

4. The security tag of claim 1, wherein said biasing means includes a stressed coil spring and said carrier has a hole reciprocably receiving a portion of said shank.

5. The security tag of claim 1, wherein said casing has a cage for said at least one clamping element and said carrier has a hole reciprocably receiving said shank and an opening communicating with said hole adjacent said cage, said pusher and said casing including means for expelling said at least one clamping element from said cage into engagement with the shank in said hole by way of said opening under the action of said biasing means.

6. The security tag of claim 1, wherein said at least one clamping element includes a sphere in rolling contact with said pusher.

7. The security tag of claim 1, wherein said sections of said housing comprise abutments for said resilient means.

8. The security tag of claim 7, wherein said resilient means comprises a leaf spring having end portions in contact with the abutments of at least one of said sections and making an acute angle with the direction of reciprocation of said carrier.

9. The security tag of claim 8, wherein said angle is approximately 25 degrees.

10. The security tag of claim 7, wherein said resilient means comprises a leaf spring having arms in contact with the abutments of at least one of said sections and making an acute angle with the direction of reciprocation of said carrier.

11. The security tag of claim 10, wherein said angle is approximately 65 degrees.

12. The security tag of claim 7, wherein said second section has a socket for said resilient means, said resilient means including a leaf spring having two substantially mirror symmetrical arms and said second section having retaining notches for portions of said arms.

13. The security tag of claim 1, wherein said ferromagnetic means is movable from a first to a second position under the action of a magnet which is placed next to said one component to thereby effect disengagement of the at least one clamping element from the first portion of said retaining member so that the latter can be separated from said housing together with said portion of the commodity.

14. The security tag of claim 13, wherein said resilient means is operative to disengage said at least one clamping element from said first portion of said retaining member by way of said ferromagnetic means in response to deformation of said one component of said housing.

* * * * *